(12) United States Patent
Jakobcic et al.

(10) Patent No.: US 10,570,778 B2
(45) Date of Patent: Feb. 25, 2020

(54) COUPLING SYSTEM FOR TURBOCHARGER AND EMISSION CONTROL DEVICE

(71) Applicant: Ford Global Technologies, LLC, Dearborn, MA (US)

(72) Inventors: Daniel Jakobcic, Northville Township, MI (US); Sami Siddiqui, Canton, MI (US); Rodolfo Palma, Sr., Canton, MI (US); Bhageerath Bogi, Northville Township, MI (US); Xiankai Song, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 243 days.

(21) Appl. No.: 15/700,888

(22) Filed: Sep. 11, 2017

(65) Prior Publication Data
US 2019/0078467 A1    Mar. 14, 2019

(51) Int. Cl.
| F01D 25/24 | (2006.01) |
| F02B 37/00 | (2006.01) |
| F01N 3/28 | (2006.01) |
| F04D 25/04 | (2006.01) |
| F04D 29/60 | (2006.01) |
| F01D 5/04 | (2006.01) |
| F04D 29/28 | (2006.01) |
| F04D 25/02 | (2006.01) |

(52) U.S. Cl.
CPC .......... *F01D 25/243* (2013.01); *F01N 3/2882* (2013.01); *F02B 37/00* (2013.01); *F04D 25/024* (2013.01); *F04D 29/601* (2013.01); *F01D 5/04* (2013.01); *F04D 29/284* (2013.01); *F05D 2220/40* (2013.01); *F05D 2260/31* (2013.01)

(58) Field of Classification Search
CPC ........ F01D 25/243; F01D 5/04; F01N 3/2882; F01N 13/1805; F01N 13/1811; F01N 13/1861; F02B 37/00; F02B 37/18; F02B 37/183; F04D 25/024; F04D 29/601; F04D 29/284; F05D 2220/40; F05D 2260/31; F16L 58/187
USPC ...... 60/598, 602, 280; 285/12–13, 263, 368, 285/181, 184; 415/214.1
See application file for complete search history.

(56) References Cited

U.S. PATENT DOCUMENTS

| 969,422 A * | 9/1910 | Tanner et al. ........... F16L 19/04 285/184 |
| 1,880,098 A * | 9/1932 | Mair ....................... H02G 3/06 285/184 |
| 1,950,207 A * | 3/1934 | Anderson ................. F16D 1/06 464/117 |
| 2,479,580 A * | 8/1949 | Marco ................. F16L 27/0849 285/181 |
| 2,933,891 A * | 4/1960 | Britt ........................ B64C 9/38 285/181 |

(Continued)

FOREIGN PATENT DOCUMENTS

| DE | 102008049093 A * | 4/2010 | ............. F02B 37/02 |
| JP | 59211718 A * | 11/1984 | ............. F02B 67/10 |

*Primary Examiner* — Thai Ba Trieu
(74) *Attorney, Agent, or Firm* — Geoffrey Brumbaugh; McCoy Russell LLP (57) ABSTRACT

Methods and systems are provided for a coupling system of a turbocharger and emissions control device of a vehicle. In one example, the coupling system may include a chamfer on one or more of the flanges of a turbine housing and a catalyst housing to decrease a distance therebetween.

19 Claims, 5 Drawing Sheets

(56) References Cited

U.S. PATENT DOCUMENTS

| | | | | |
|---|---|---|---|---|
| 3,581,504 A | * | 6/1971 | Andrus | F02K 9/48 415/159 |
| 3,704,995 A | * | 12/1972 | Hetherington | F01N 13/1811 285/332 |
| 3,912,306 A | * | 10/1975 | McCormick | F01N 13/1805 285/12 |
| 4,206,600 A | * | 6/1980 | Feuling | F02B 27/04 138/37 |
| 4,397,486 A | * | 8/1983 | Ohya | F01N 13/1805 285/368 |
| 4,848,808 A | * | 7/1989 | Pannell | F16L 21/08 285/337 |
| 5,261,807 A | * | 11/1993 | Hehl | B29C 45/20 425/192 R |
| 5,406,795 A | | 4/1995 | Raub et al. | |
| 5,505,498 A | * | 4/1996 | Halling | F16L 27/06 285/263 |
| 5,851,033 A | * | 12/1998 | Hunt | F16L 58/187 285/13 |
| 6,256,990 B1 | * | 7/2001 | Itoh | F01N 13/10 60/323 |
| 6,561,549 B1 | * | 5/2003 | Moris | F16L 27/0841 285/181 |
| 8,544,267 B2 | * | 10/2013 | Danielewicz | F01N 13/1805 285/133.11 |
| 8,585,101 B2 | * | 11/2013 | Loebig | F01N 13/1827 285/406 |
| 8,887,493 B2 | | 11/2014 | Shin | |
| 9,016,061 B2 | * | 4/2015 | Gunkel | F01N 13/1811 248/637 |
| 9,140,171 B2 | * | 9/2015 | Schmitt | F01N 13/1805 |
| 9,181,848 B2 | * | 11/2015 | Smith | F01N 13/1805 |
| 9,617,902 B2 | | 4/2017 | Takano | |
| 2007/0217941 A1 | * | 9/2007 | Hayashi | F01N 13/1861 420/38 |
| 2008/0084065 A1 | * | 4/2008 | Ogimura | F01N 13/1811 285/369 |
| 2008/0169648 A1 | * | 7/2008 | Kwon | F16L 21/065 285/364 |
| 2013/0129502 A1 | * | 5/2013 | Schaefer | F01D 25/243 415/214.1 |
| 2015/0089932 A1 | * | 4/2015 | Takatsu | F01N 13/08 60/299 |
| 2016/0298521 A1 | * | 10/2016 | Kogure | F01N 13/1805 |
| 2017/0002672 A1 | * | 1/2017 | Shudo | F01D 25/24 |

\* cited by examiner

COUPLING SYSTEM FOR TURBOCHARGER AND EMISSION CONTROL DEVICE

FIELD

The present description relates generally a coupling system of a turbocharger and emissions control device of a vehicle.

BACKGROUND/SUMMARY

A vehicle including an internal combustion engine may include a turbocharger having a turbine. The turbine may be coupled to the engine via one or more exhaust passages. Exhaust gases flow from the engine, through the exhaust passages, and into an inlet end of a housing of the turbine, where the exhaust gases expand to drive the turbine. The exhaust gases may then flow out of an outlet end of the turbine and toward an emissions control device. The emissions control device may be a catalytic converter configured to remove hazardous substances such as carbon monoxide (CO), nitrogen oxides ($NO_x$), unburned hydrocarbons (HC), sulfur oxides ($SO_x$), and/or other compounds from the exhaust gases.

The outlet end of the turbine and an inlet end of the emissions control device are often coupled to opposite ends of an exhaust conduit by one or more fastening devices such as bands, v-clamps, etc. in order to flow exhaust gases from the turbine, through the conduit, and to the emissions control device. One example approach is shown by Schmitt et al. in U.S. Pat. No. 9,140,171. Therein, a flange is disclosed which includes a pipe section projecting away from the flange along a longitudinal center axis, with the center axis being perpendicular to a plane of the flange. The flange includes a plurality of fastening areas arranged radially outward from the pipe section, and the flange can be fastened to a complementary counter flange via the fastening areas (in order to couple an exhaust pipe to a catalytic converter, for example). Another example approach is shown by Loebig in U.S. Pat. No. 8,585,101. Therein, a flange connection is provided for a turbocharger and an exhaust system. The flange connection includes a clamping bracket that engages over flanges provided on the turbocharger and on the exhaust system and clamps them with one another using at least one screw, which, using a screw thread provided in the clamping bracket, exerts pressure on a pressure part, which in turn exerts pressure on the edges of the flanges.

However, the inventors herein have recognized potential issues with such systems. As one example, radially extending a location of tabs, as shown in Schmitt, configured to receive a bolt or a screw for connecting flanges may result in degradation of the tabs due to vibrations and heat due to engine combustion. Additionally, a distance between a catalyst and the turbine housing may be relatively large due to the accessibility of the tabs. For example, an assembly worker may use a drill or other similar device to thread a bolt or screw through the tabs. As such, a distance between the catalyst and the turbine housing may be dependent based on a size of the drill. As another example, the clamping bracket of Loebig may present certain challenges. For example, the clamping bracket is aligned with an opening in a flange prior to a screw being threaded therethrough by an assembly worker. This presents assembly challenges which may increase manufacturing costs and decrease a manufacturing efficiency.

In one example, the issues described above may be addressed by a system comprising a turbine housing comprising a first passage arranged within a first flange configured to centrally align with a second passage arranged within a chamfer of a second flange of a catalyst housing and a fastener passing through the second passage and locked with the first passage. In this way, the first and second passages are angled relative to a central axis of the catalyst housing, allowing a distance between the turbine housing and the catalyst housing to decrease.

As one example, a fastener may pass through the second passage and couple to the first passage. Once the fastener is locked with the first passage, flat surfaces of the first and second flanges may be pressed together in face-sharing contact. To fasten the fastener to the first passage, a tool (e.g., a drill) is used to rotate the fastener about a central axis of the first and second passages. By angling the second passage via the chamber, the fastener may be accessed by the tool in a location generally away from the catalyst housing. This may allow a distance between the catalyst housing and the turbine housing to be reduced relative to the examples of Schmitt and Loebig. By doing this, heat loss may be mitigated, packaging constraints may be reduced, and emissions may decrease.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-5C are shown to scale, though other relative dimensions may be used, if desired.

DETAILED DESCRIPTION

Figure 2:
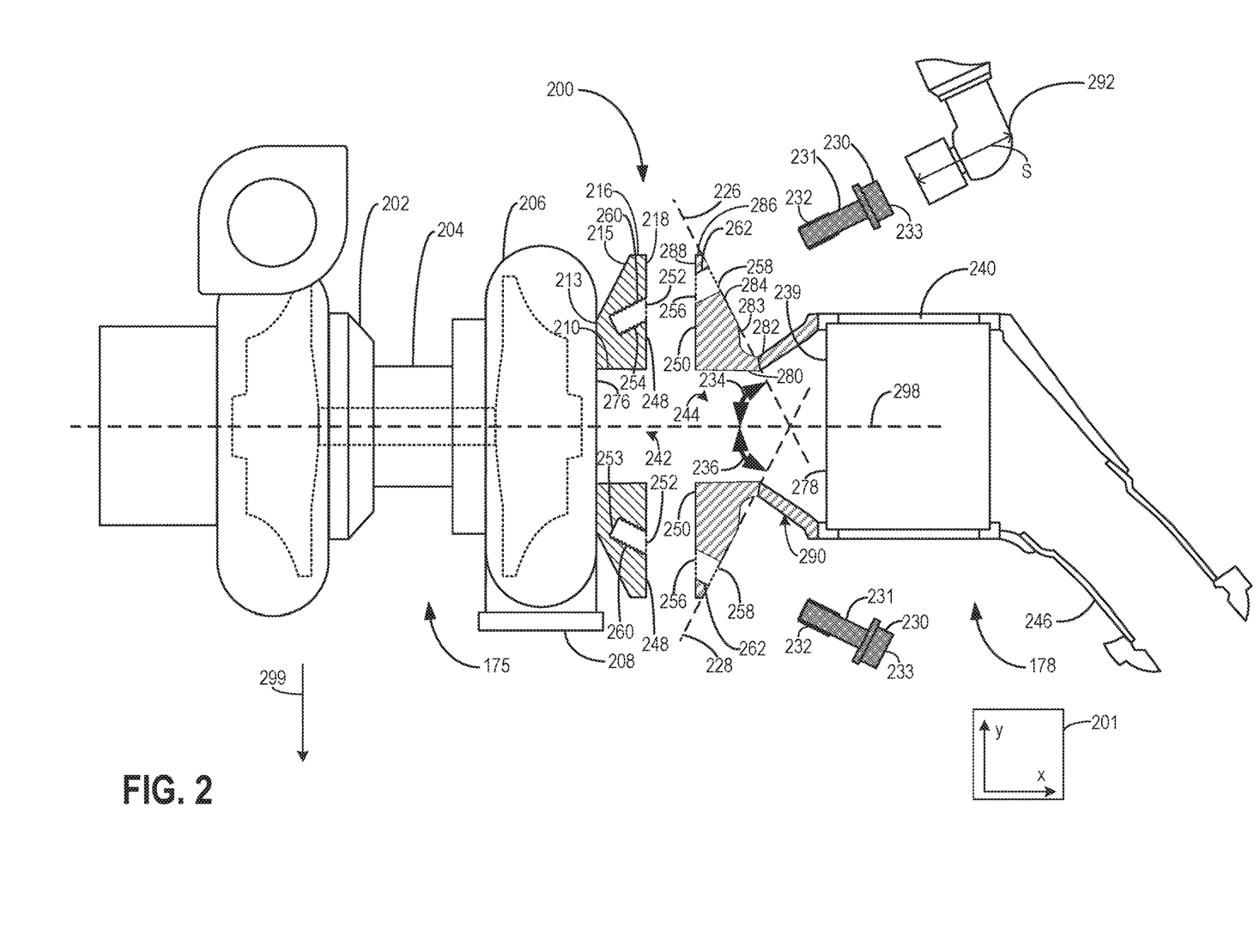
FIG. 2 shows a side view of a coupling system of a turbocharger and an emissions control device, with the coupling system shown in cross-section, and with a turbine housing of the turbocharger decoupled from a catalyst housing of the emissions control device.
Figure 3:
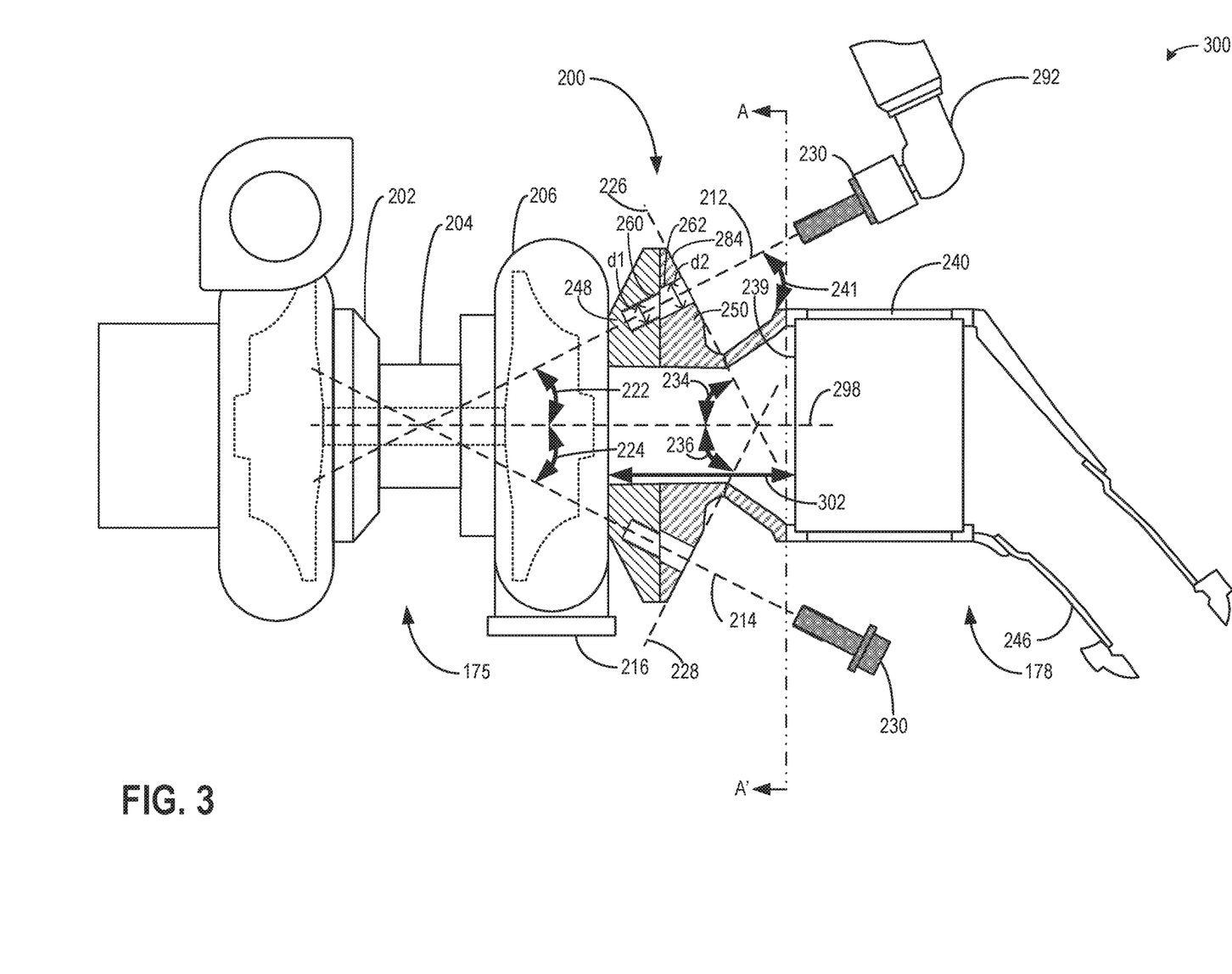
FIG. 3 shows a side view of the coupling system of FIG. 2, with a planar surface of the turbine housing positioned in face-sharing contact with a counterpart planar surface of the catalyst housing.
Figure 4:
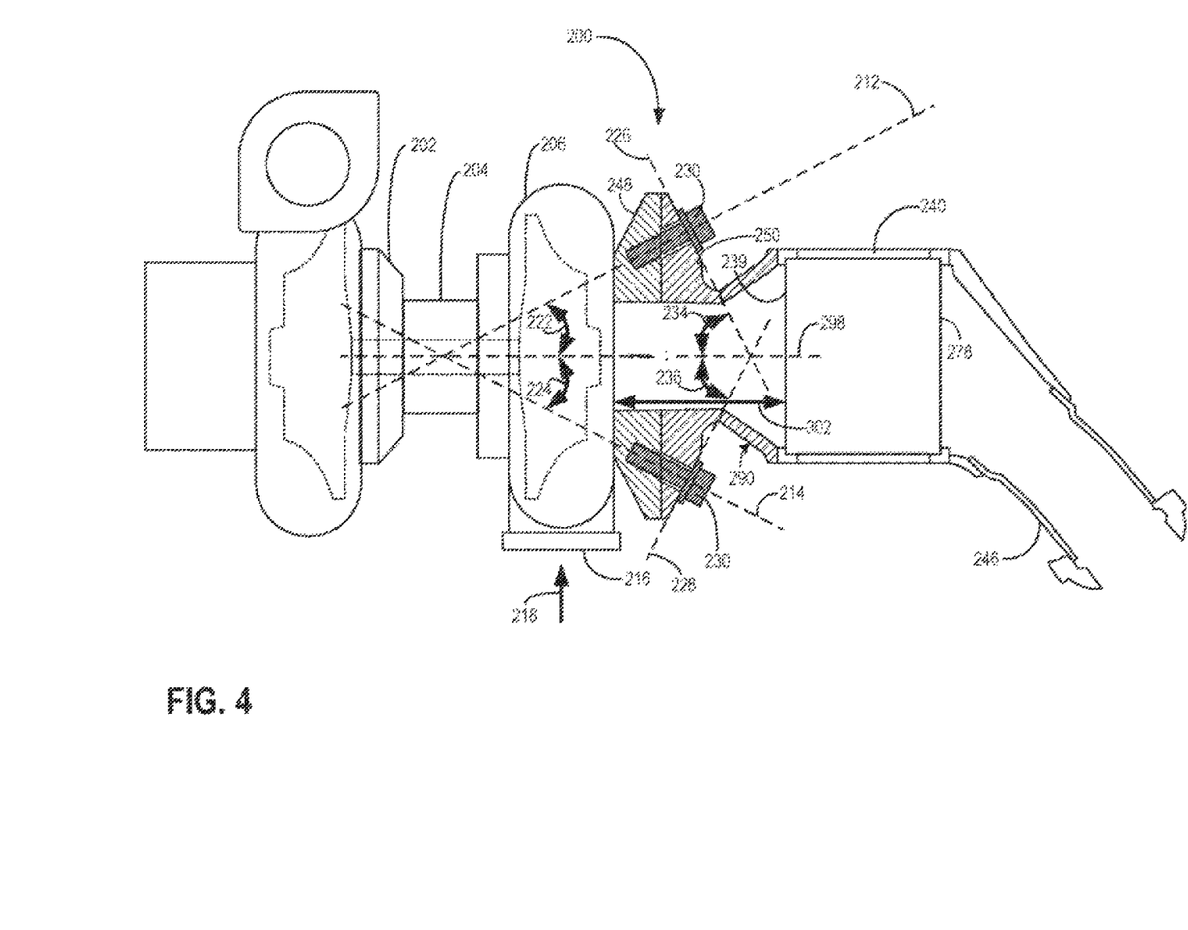
FIG. 4 shows a side view of the coupling system of FIGS. 2-3, with the turbine housing coupled to the catalyst housing.
Figure 5A:
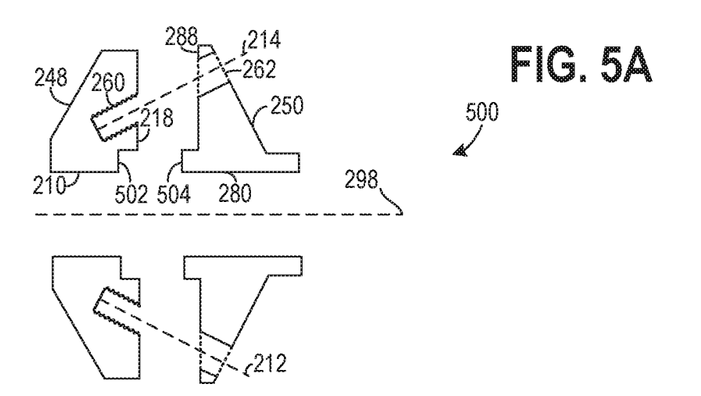
FIGS. 5A, 5B, and 5C show exemplary embodiments of the coupling system shown in FIGS. 2-4.
Figure 5B:
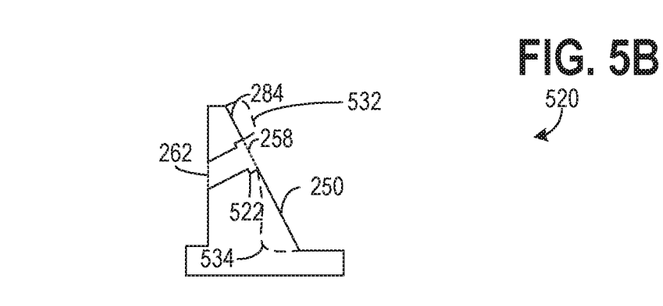
Figure 5C:
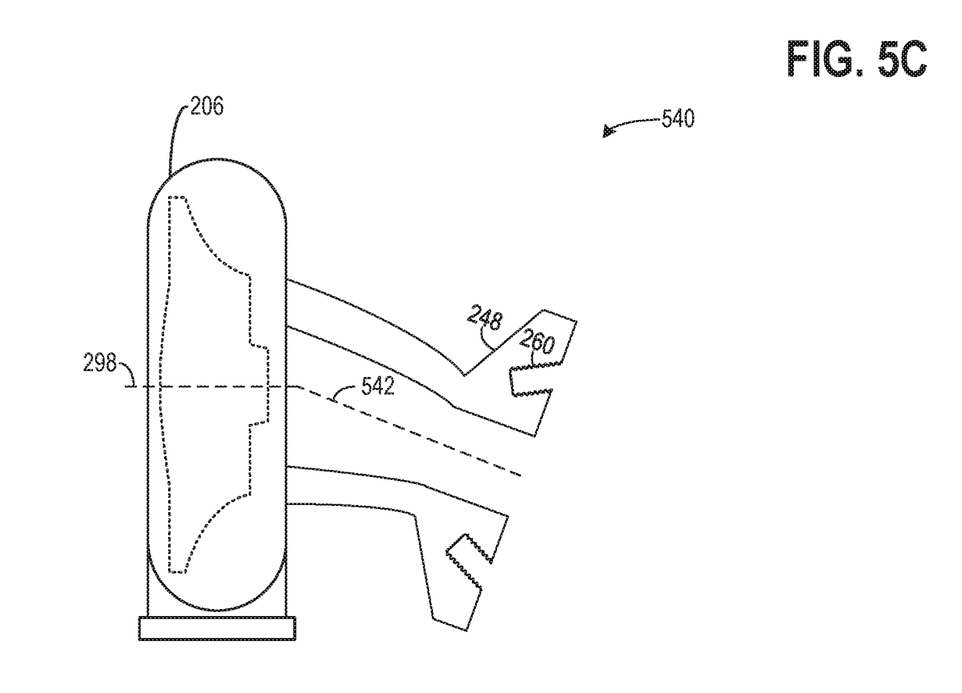

The following description relates to systems and methods for a coupling system of a turbocharger and emission control device of a vehicle. An engine system, such as the engine system shown by FIG. 1, includes a turbocharger and an emissions control device. The turbocharger includes a turbine housed within a turbine housing, and the emissions control device includes one or more catalysts housed within a catalyst housing, as shown by FIG. 2. The turbocharger and emissions control device are coupled to each other via a coupling system. The coupling system includes a planar surface of the turbine housing shaped to engage a counterpart planar surface of the catalyst housing, as shown by FIG. 3. The planar surfaces of the turbine housing and catalyst housing are pressed together and positioned such that apertures formed by the planar surface of the turbine housing are aligned with apertures formed by the counterpart planar surface of the catalyst housing. A fastener passes through the apertures and presses the flanges of the turbine housing and the catalyst housing together. An example of exhaust gas flowing from the turbine housing, through an opening between the flanges, and to the catalyst housing is shown in FIG. 4. A first embodiment of the coupling system is shown in FIG. 5A, where the flanges of the coupling system include an additional mating outside of the passages configured to receive a fastener. In one example, the additional mating is an indentation. A second embodiment of the coupling system is shown in FIG. 5B, where the passage of the flange associated with the catalyst housing comprises a receiving portion for the fastener to press against. In one example, the receiving portion allows a head of the fastener to be flush with an angled surface of the flange associated with the catalyst housing. A third embodiment of the coupling system is shown in FIG. 5C, where the flange associated with the turbine housing may be angled relative to a direction of exhaust output from the turbine housing. The angling of the flange associated with the turbine housing may be based on exhaust system geometries, thereby allowing the turbine housing flange to reduce packaging constraints.

FIGS. 2-5C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Note that FIG. 4 show arrows indicating where there is space for gas to flow, and the solid lines of the device walls show where flow is blocked and communication is not possible due to the lack of fluidic communication created by the device walls spanning from one point to another. The walls create separation between regions, except for openings in the wall which allow for the described fluid communication.

Figure 1:
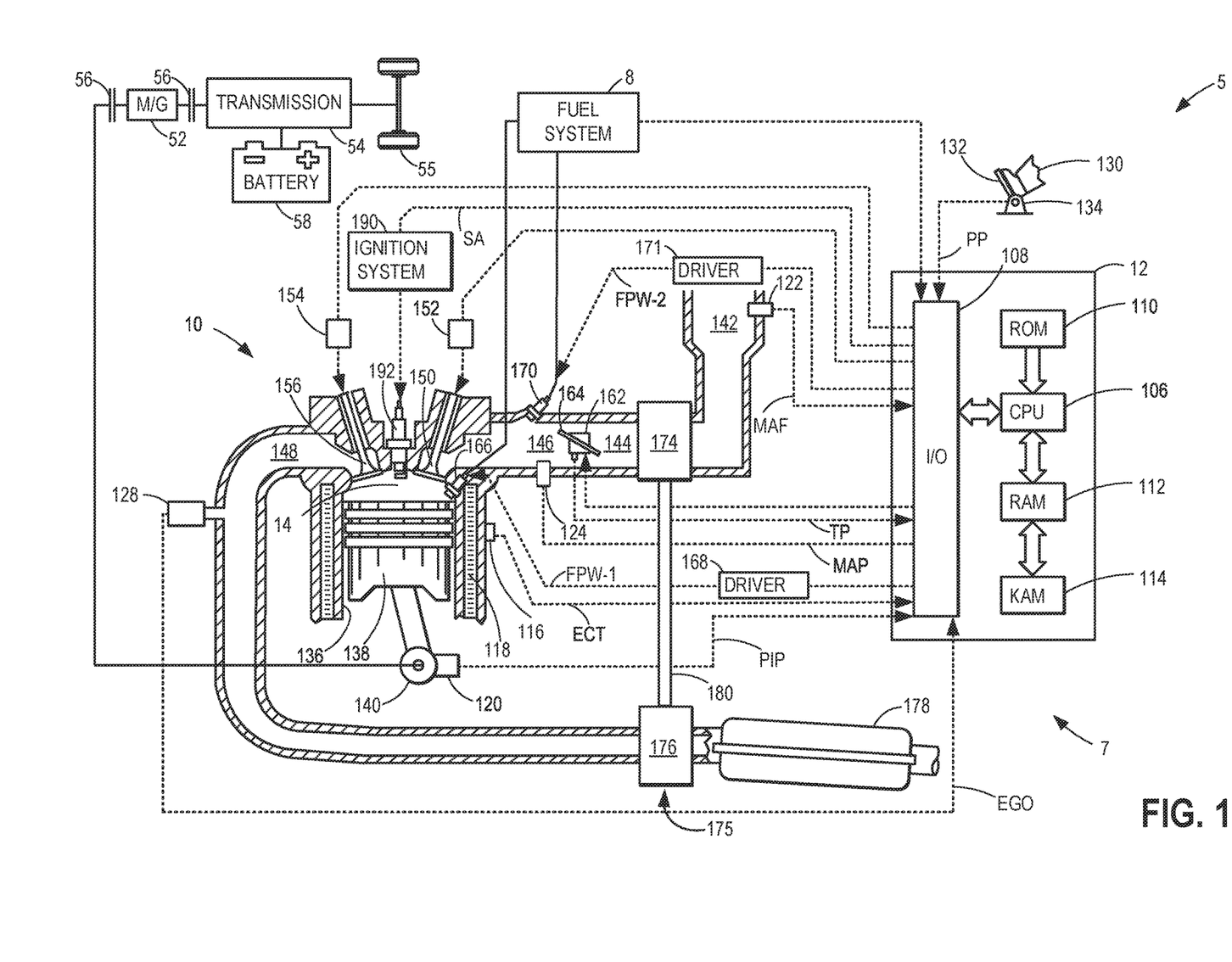
FIG. 1 shows a schematic diagram of an engine system including a turbocharger coupled to an emissions control device.

FIG. 1 depicts an example of a cylinder of internal combustion engine 10 included by engine system 7 of vehicle 5. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder 14 (which may be referred to herein as a combustion chamber) of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. FIG. 1 shows engine 10 configured with a turbocharger 175 including a compressor 174 arranged between intake passages 142 and 144, and an exhaust turbine 176 arranged along exhaust passage 148. Compressor 174 may be at least partially powered by exhaust turbine 176 via a shaft 180. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. Ignition system 190 can provide an ignition spark to cylinder 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. Fuel system 8 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port fuel injection (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Controller 12 may infer an engine temperature based on an engine coolant temperature.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

In some examples, vehicle 5 may be a hybrid vehicle with multiple sources of torque available to one or more vehicle wheels 55. In other examples, vehicle 5 is a conventional vehicle with only an engine. In the example shown, vehicle 5 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

FIG. 2 shows a coupling system 200 of turbocharger 175 and an emission control device 178 (e.g., a catalytic converter) in a decoupled state (e.g., with the turbocharger 175 and emission control device 178 decoupled from each other). As such, components previously introduced may similarly numbered in the subsequent figures. Specifically, turbocharger 175 includes a turbine housing 206, emission control device 178 includes a catalyst housing 240, and FIG. 2 shows the turbine housing 206 and catalyst housing 240 decoupled from each other. The turbocharger 175 and emissions control device 178 may be included within an engine system (e.g., within engine system 7 as described above with reference to FIG. 1).

An axes system 201 comprising two axes, namely an x-axis parallel to a horizontal direction and a y-axis parallel to a vertical direction is shown. A direction of gravity is shown via arrow 299 (herein gravity 299). A central axis is shown via a dashed line 298 (herein, central axis 298) parallel to the x-axis. A height of components described herein is in reference to a distance a component extends along the y-axis. A length of components described herein is in reference to a distance a component extends along the x-axis.

The turbocharger 175 includes the turbine housing 206 housing a turbine wheel (e.g., turbine 176 of FIG. 1), compressor housing 202 housing a compressor wheel (e.g., compressor 174 of FIG. 1), and shaft housing 204 housing a shaft (e.g., shaft 180 of FIG. 1) coupling the turbine wheel to the compressor wheel. An inlet end 208 of the turbine housing 206 may be coupled to one or more exhaust passages of the engine system (e.g., exhaust passage 148 described above with reference to FIG. 1) in order to flow exhaust gases from the engine into the turbine housing 206 and to the turbine wheel. Exhaust gases flowing into the turbine housing 206 may expand within the turbine housing 206 to drive (e.g., rotate) the turbine wheel. The turbine wheel drives the compressor wheel via the shaft such that a rotation of the turbine wheel around central axis 298 of the turbocharger 175 results in a rotation of the compressor wheel around the central axis 298. As the exhaust gases expand and drive the turbine wheel, the exhaust gases flow out of an outlet end 276 of the turbine housing 206 and toward an inlet end 239 of the emissions control device 178 (as shown by FIG. 4 and described below).

Specifically, exhaust gases flowing through the outlet end 276 of the turbine housing 206 flow through an opening 242 of a flange 248. The opening 242 may be symmetrically spaced about the central axis 298. In one example, the opening 242 is circular and the central axis 298 passes directly through its geometric center. The flange 248 defines a boundary of the opening 242.

The flange 248 may comprise five sides generating an asymmetrical pentagon. A first surface 210 may be nearest the opening 242 and define its outer circumference. In some examples, additionally or alternatively, the opening 242 may be square-shaped and its outer perimeters. In this way, the first surface 210 may be curved or straight. At any rate, the first surface 210 does not contact ambient air and contacts only exhaust gases passing from the turbine housing 206 to the catalyst housing 240, in one example. In other words, the first surface 210 may be enclosed from an ambient atmosphere and forms a passage extending from the turbine housing 206 to the catalyst housing 240.

A second surface 213 extends directly from the first surface 210 and may be directly coupled to the turbine housing 206 via one or more of welds, fusions, screws, adhesives, and the like. The second surface 213 is shown parallel to and in face-sharing contact with the turbine housing. In one example, the first surface 210 is parallel to the x-axis and the second surface 213 is parallel to the y-axis.

The flange 248 may further comprise a chamfered surface 215, which is angled to the central axis 298 and the turbine housing 206. In other words, the chamfered surface 215 is oblique and/or angled to both the x- and y-axes. In one example, the chamfered surface 215 is the only surface of the flange 248, which is not parallel or perpendicular to the x- and y-axes. An angle of the chamfered surface will be described in greater detail below.

In some examples, the flange 248 may not include the chamfered surface 215. As such, the second surface 213 and a third surface 216 may come into direct contact with one another with no intervening components located therebetween.

The third surface 216 is directly coupled to the chamfered surface 215. The third surface 216 is parallel to the x-axis. In one example, when the turbine housing 206 and the catalyst housing 240 are coupled, the chamfered surface 215 and the third surface 216 are the only surfaces of the flange 248 contacting ambient air outside of an exhaust passage 246.

The flange 248 further comprises a fourth surface 218 in direct contact with both the third surface 216 and the first surface 210. The fourth surface 218 is positioned parallel to the y-axis and may be configured to receive a similar surface of a flange 250 of the catalyst housing 240. Herein, the flange 248 is referred to as the first flange 248 and the flange 250 is referred to as the second flange 250. In some examples, the fourth surface 218 may comprise one or more cutouts configured to increase coupling between the first flange 248 and the second flange 250.

Thus, the first flange 248 is spaced around the first opening 242, which allow exhaust gas to flow from the turbine housing 206, through the first opening 242, through a second opening 244 arranged interior to the second flange 250. In one example, the first flange 248 and first opening 242 are substantially similar to the second flange 250 and the second opening 244. Thus, the first opening 242 and the second opening 244 may align with one another along the central axis 298 when the first flange 248 and the second flange 250 are physically coupled and pressed against one another via one or more fasteners 230. Furthermore, the second flange 250 comprises a first surface 280, a second surface 282, a chamfered surface 284, a third surface 286, and a fourth surface 288 which may be substantially similar to the first surface 210, the second surface 213, the chamfered surface 215, the third surface 216, and the fourth surface 218 of the first flange 248. Additionally or alternatively, one or more of the surfaces of the second flange 250 may differ from corresponding surfaces of the first flange 248. For example, the second surface 282 of the second flange 250 may differ from the second surface 213 of the first flange 248. A height of the second surface 282 may be less than a height of the second surface 213. The second surface 282 of the second flange 250 may shorter due to a combination of the chamfered surface 286 and a transition 290 extending between the second flange 250 and the catalyst housing 240. The transition 290 increases a diameter of the exhaust passage 246. Specifically, the transition 290 increases a diameter of the exhaust passage 246 in a downstream direction continuously and uniformly from the second flange 250 to the catalyst 278.

Each of the surfaces of the first 248 and second 250 flanges may be smooth, planar surfaces. Thus, each of the surfaces of the first 248 and the 250 flanges may have no intervening components and/or protrusions and/or indentations located thereon. In some examples, one or more surfaces of the first 248 and second 250 flanges may comprise an ingot, marking, or some other indentation and/or protrusion. An embodiment of a protrusion and/or indentation is shown in FIG. 5A, where the first 248 and second 250 flanges comprise shapes configured to assist in coupling the two flanges. For example, an indentation 283 is shown between the second surface 282 and the chamfered surface 284. The indentation 283 is optional and may be excluded from the second flange 250 in other embodiments. Additionally or alternatively, the indentation 283 may also be included in the first flange 248 between the second surface 213 and the chamfered surface 215. As an example, the indentation 283 may increase a flexibility of a flange prior to the turbine housing 206 and the catalyst housing 240 being coupled. As such, the flange(s) may be at least partially bent to make aligning the flanges more easy during assembly of an exhaust system.

The fourth surface 218 of the first flange 248 may be shaped to receive and press against the fourth surface 288 of the second flange 250. In this way, the fourth surface 218 of the first flange 248 may be parallel to the fourth surface 288 of the second flange 250. When the fourth surface 218 of the first flange 248 and the fourth surface 288 of the second flange 250 are pressed together such that the first surface 210 is in-line with the first surface 280 and the third surface 216 is in-line with the third surface 286, then a first passage 260 of the first flange 248 and a second passage 262 of the second flange 250 may align. In one example, the first passage 260 and the second passage 262 centrally align, wherein geometric centers of the passages are in alignment, as shown in FIG. 3. In this way, the first passage 260 and the second passage 262 may form a single, contiguous passage when the first flange 248 and the second flange 250 are fastened together. In some examples, there may be one or more gaskets arranged between the fourth surface 218 and 288 when the first flange 248 is fully coupled to the second flange 250.

A diameter of the second passage 262 may be larger than a diameter of the first passage 260. In one example, an outlet 256 of the second passage 262 completely overlaps and/or surrounds an inlet 252 of the first passage 260 when the first 260 and second 262 passages are aligned. The second passage 262 may be larger to allow a fastener 230 to extend therethrough and radially move within the second passage to allow an assembly worker to more easily couple the first 248 and second flanges, as will be described in greater detail with respect to FIG. 3.

The second passage 262 comprises an inlet 258 at the chamfer surface 284 facing a direction angled to the central axis 298. In one example, the angle of the second passage 262 is adjusted based on an angle of the chamfered surface 284. Specifically, the chamfered surface 284, above the central axis 298, is angled relative to the central axis 298 by an angle 234. The angle 234 is measured between the central axis 298 and dashed line 226, which indicates a plane of the chamfered surface 284 above the central axis 298. The angle 234 may be equal to angle between 5 to 60 degrees. In one example the angle 234 is exactly equal to 30 degrees. Additionally, the chamfered surface 284 arranged below the central axis 298, is angled relative to the central axis 298 by an angle 236. In one example, the angle 236 is exactly equal to the angle 234. In some examples, the angle 234 is adjusted such that it is perpendicular to a central axis of the second passage 262, where the central axis is parallel to a direction which the one fastener of the fasteners 230 extends therethrough. The angle 236 is measured between the central axis 298 and dashed line 228, which indicates a plane of the chamfered surface 284 below the central axis 298. Additionally or alternatively, the angle 236 may be greater than or less than the angle 234 based on one or more of exhaust passage geometries, accessibility, and the like. The second passage 262 extends from the chamfered surface 284 to the fourth surface 288 of the second flange. Thus, the second passage 262 traverses an entire width of the second flange 250. Thus, the outlet 256 of the second passage 262 is arranged on the fourth surface 288. The outlet 256 and the inlet 258 may be substantially similar in size and shape. In one example, the outlet 256 and the inlet 258 are exactly the same size and both are circular. A diameter of the second passage 262 may be uniform and equal to the diameters of the outlet 256 and inlet 258 such that the diameter of the second passage 262 does not increase or decrease between the inlet 258 and outlet 256. However, the size and shape of the outlet 256 and the inlet 258 may be adjusted without departing from the scope of the present disclosure. As shown, the second passage 262 is smooth and does not comprise threading or the like. However, it will be appreciated that the second passage 262 may comprise threading or the like without departing from the scope of the present disclosure.

The first passage 260 may receive the fastener 230 after it extends completely through the second passage 262. The first passage 260 comprises threading 254 extending from its inlet 252 to an extreme end 253. In this way, the first passage 260 is a blind-hole. In some examples, the first passage may be a through-hole and the extreme end 253 may be open. The fastener 230 may be used to fasten the first flange 248 with the second flange 250. As shown, the fastener 230 may be used on portions of the first 248 and second 250 flanges above and below the central axis 298. In this way, the first and second flanges comprise first and second passages, respectively, above and below the central axis 298, each capable of receiving the fastener 230. In one example, the first flange 248 comprises exactly two first passages and the second flange 250 comprises exactly two second passages such that two of the fasteners 230 are used to fully couple the first and second flanges. In this way, a number of first passages 260 in the first flange 248 is equal to a number of second passage 262 in the second flange 250. Additionally, a number of fasteners used to couple the first and second flanges is equal to the number of first and second passages. It will be appreciated that there may be other numbers of first and second passages in other embodiments without departing from the scope of the present disclosure. For example, there may be three, four, or more of the first and second passages. The number of fasteners 230 may be correspondingly adjusted.

The fastener 230 may comprise a head 233 at a first extreme end. The fastener 230 may further comprise threading 232 adjacent a second extreme end, opposite the head 233. Between the threading 232 and the head 233, there is a shank 231, which is smooth relative to the threading 232. In other words, the shank 231 is cylindrical without any protrusions or ridges extending therefrom while the threading 232 includes a spiral-shaped protrusion circumnavigating the fastener 230 from the second extreme end to the shank 231. As such, a diameter of the threading 232 may be larger than a diameter of the shank 231 based on a thickness of the threading 232.

The fastener 230 may enter the second passage 262 via the inlet 258 and completely traverse the second passage 262, thereby extending through the outlet 256 of the second passage 262 toward the first passage 260. The first passage 260 may receive the threading 232 of the fastener 230. In one example, the threading 232 is complementary to a threading 254 of the first passage 260 such that the fastener 230 can be locked to the first passage 260 after traversing the width of the second flange 250. In one example, by locking the threading 232 of the fastener 230 to the threading 254 of the first passage 260, the fastener 230 is tightened into the first passage 260. A device 292 (e.g., a drill) may be configured to rotate the fastener 230. This may lock the threading 232 of the bolt to the threading 254 of the first passage 260, allowing the fastener 230 to advance further into the first passage 260. The bolt 230 is completely locked with the first passage 260 when the fourth surface 218 of the first flange 248 is pressed against and in face-sharing contact with the fourth surface 288 of the second flange 250. Additionally or alternatively, when the bolt is completely locked with the first passage 260, a portion of the head 233 nearest the shank 231 is flush with and pressed against the chamfered surface 284. In one example, when the head 233 is pressed against the chamfered surface 284 of the second flange 250, the head 233 covers the inlet 258 of the second passage 262 such that the second passage 262 is sealed from an ambient atmosphere.

As an example, the device 292 is a smallest version of a device capable of fastening the fastener 230 through the second flange 250 to the first flange 248. As such, an allowable distance and/or clearance between surfaces of the second flange 250 and the transition 290 are dependent based on a size of the device 292. In other words, for a catalyst housing 240 comprising a flange that does not include a chamfered surface, a distance between an inlet of a second passage and the extension is at least slightly greater than a size S of the device 292. This may result in a first surface having a length greater than a length of the first surface 280 illustrated. By increasing the first surface length, a distance between the catalyst housing 240 and the turbine housing 206 increases, which may result in thermal losses, packaging constraints, and increased emissions. These issues may be avoided by chamfering at least the flange of the emission control device 178 coupled to the transition 290 of the catalyst housing 240. By adjusting the angle about which the second passage is oriented, the device 292 may access the second passage and couple the second flange 250 to the first flange 248 more easily relative to a second flange, which does not include the chamfer. In this way, the distance between the catalyst housing 240 and the turbine housing 206 is independent of the size S of the device 292, and may be less than the size S. As such, the distance between the turbine housing 206 and the catalyst housing 240 may be reduced when the second flange 250 is chamfered. This may result in lower thermal losses, fewer packaging constraints, and reduced emissions.

Turning now to FIG. 3, it shows an embodiment 300 of the first flange 248 being pressed against the second flange 250. In the embodiment 300, the first passage 260 and the second passage 262, above the central axis 298, are centrally aligned along an axis 212. Similarly, the first passage 260 and the second passage 262, below the central axis 298, are centrally aligned along an axis 214. The axes 212 and 214 may be perpendicular to the axes 226 and 228, respectively. The axis 212 represents a geometric center of the first 260 and second 262 passages, above the central axis 298, when the passages are aligned. Likewise, the axis 214 represent a geometric center of the first 260 and second 262 passages, below the central axis 298, when the passages are aligned. The axis 212 forms an angle 222 with the central axis 298 and the axis 214 forms an angle 224 with the central axis 298. In one example the angles 222 and 224 are substantially identical. Thus, the first 260 and second 262 passages above the central axis 298 and the first 260 and second 262 passages below the central axis 298 are mirrored about the central axis 298.

In some examples, additionally or alternatively, the angles 222 and 224 may be different such that the first 260 and second 262 passages above the central axis 298 do not mirror the first 260 and second 262 passages below the central axis 298. In other words, the first 260 and second 262 passages above the central axis 298 may be oriented differently than the first 260 and second 262 passages below the central axis 298. This may result in the angles 222 and 224 being unequal, leading to one or more of the axes 212 and 214 not being perpendicular to the chamfered surface 284

(e.g., greater than or less than 90 degrees). For example, the angle 224 may be larger than the angle 222 due to the direction of the exhaust passage 246. This may enable easier access to first 260 and second 262 passages below the central axis 298 with the device 292. Additionally or alternatively, the chamfered surface 284 may be different along different portions of the second flange 250. For example, the angle 234, which corresponds to the chamfered surface 284 above the central axis 298, may be different than the angle 236, which corresponds to the chamfered surface 284 below the central axis 298. For an example where the chamfered surfaces 284 are perpendicular to the axes 212 and 214, then the axes 212 and 214 may intersect at a location different than the central axis 298 (e.g., above or below). In this way, fasteners above the central axis 298 may be oriented at an angle different than fasteners below the central axis 298.

The first passage 260 and the second passage 262 are shown centrally aligned with the first 248 and second 250 flanges pressed together. However, during assembly, this may be difficult to accomplish when the fastener 230 is not passed through the second passage 262. In other words, the fastener 230 may be passed through the second passage 262 and directed in the direction of the first passage 260 while the first flange 248 and the second flange 250 are spaced apart. A diameter d2 of the second passage may be greater than a diameter dl of the first passage 260, where the diameter dl undulates according to the threading 254. In one example, the diameter dl is equal to a diameter of the threading 232. The diameter d2 may be equal to 1.5 times the diameter dl. In one example, the diameter d2 is equal to 1.2 times the diameter dl. Since the second passage 262 is oversized relative to and/or larger than the threading 232 and shank 231, the fastener 230 may move within the second passage 262 in a radially direction to allow an assembly worker to align the fastener 230 with the first passage 260. By allowing the fastener 230 to loosely pass through the second passage 262 toward the first passage 260, the assembly worker may insert the fastener 230 into the first passage 260 more quickly compared to an embodiment where the second passage 262 comprises a smaller diameter (e.g., a diameter equal to dl).

In some examples, the first passage 260 may receive the fastener 230 prior to the second passage 262. As such, the fastener 230 may pass through the first passage 260 before entering, and locking with, the second passage 262. An orientation of the first passage 260 in the first flange 248 may be flipped relative to the y-axis and an orientation of the second passage 262 may be correspondingly adjusted such that the axes 212 and 214 intersect at a location near the catalyst housing 240. Additionally, the second passage 262 may comprise threading or the like for locking with the fastener.

Double-headed arrow 241 indicates a clearance generated by the chamfered surface of the second flange 250 between the device 292 and the catalyst housing 240. This clearance allows the distance 302 between the catalyst housing 240 and the turbine housing 206 to decrease relative to a system that does not comprise a flange with a chamfered surface. In other words, if the chamfered surface is not included in at least the second flange 250 of the catalyst housing 240, then the distance 302 would increase based on a size (e.g., size S of FIG. 2) of the device 292.

Turning now to FIG. 4, it shows a fully assembled view 400 of the turbine housing 206 and the catalyst housing 240 being coupled. Specifically, in the fully assembled view 400, the first flange 248 is pressed against the second flange 250. The fastener 230 extends through the second passage 262 and physically couples to the first passage 260. As shown, the fastener 230 is arranged in the second passage 262 such that surface of the fastener 230 are spaced away from interior surface of the second passage 262. In this way, the fastener 230 does not touch surfaces of the second passage 262 when the turbine housing 206 and the catalyst housing 240 are fully assembled.

Exhaust gas is shown entering the turbine housing 206 via arrow 418 is a direction perpendicular to the central axis 298. After flowing through the turbine housing 206, the exhaust gas turns and flows into a space arranged between the first 248 and second 250 flanges in a direction parallel to the central axis 298. As shown, exhaust gas does not flow through the first 248 and second flanges 250 to an ambient atmosphere or an engine (e.g., engine 10 of FIG. 1). Furthermore, no outside gases are introduced to the space between the first 248 and second 250 flanges other than gases from the turbine housing 206. As such, there are no other inlets or additional outlets between the first 248 and second 250 flange other than a turbine housing outlet and a catalyst housing inlet. Additionally, the first flange 248 and the second flange 250 are not coupled to an EGR passage, an intake passage, a heat exchanger, or the like.

It will be appreciated that in some embodiments the first 248 and/or second 250 flanges may be configured to flow exhaust gas from downstream the turbine housing 206 to a location different than the catalyst housing 240. For example, exhaust gas may flow to an intake passage, heat exchanger, or the like.

After flowing between the first 248 and second flanges 250, the exhaust gas flows to the catalyst 278 in the catalyst housing 240, where constituents in the exhaust gas may be reduced, oxidized, and/or trapped by the catalyst 278.

Turning now to FIG. 5A, it shows an embodiment 500 of the first flange 248 and the second flange 250 comprising one or more protrusions and/or indentations thereon. Specifically, the first flange 248 comprises an indentation 502 arranged at the intersection between the first surface 210 and the fourth surface 218. The indentation 502 is square-shaped in one example, and extends around an entire interior circumference of the first flange 248. The indentation 502 may be other shapes without departing from the scope of the present disclosure. For example, the indentation 502 may be circular, triangular, or the like. The indentation may be configured to receive a protrusion 504 of the second flange 250. The protrusion 504 is arranged along the intersection between the first surface 280 and the fourth surface 288. The protrusion 504 may be sized such that each of its surfaces is in face sharing contact with surfaces of the indentation 502. When this occurs, the fourth surface 218 of the first flange 248 may be pressed against and flush with the fourth surface 288 of the second flange 250. Additionally, the first passage 260 may align with the second passage 262 and be positioned to receive a fastener (e.g., one of the fasteners 230 of FIG. 2).

In some examples, the first flange 248 may comprise a protrusion and the second flange may comprise an indentation. Additionally or alternatively, different portions of the first flange 248 and second flange 250 may comprise different shaped indentations and protrusions when the axes 212 and 214 are different. For example, if the axis 212 forms a first angle with the central axis 298 that is different from a second angle formed between the axis 214 and the central axis 298, then the orientation of the first 260 and second 262 passages below the central axis 298 is different than the orientation of the first 260 and second 262 passages above the central axis 298. As such, the portion of the first flange 248 above the central axis 298 may comprise the indentation 502 and the portion of the first flange 248 below the central axis 298 may comprise the protrusion 504. Additionally, the portion of the second flange 250 above the central axis may comprise the protrusions 504 and the portion of the second flange 250 below the central axis 298 may comprise the indentation 502. This may assist an assembly worker in assembling the first 248 and second 250 flanges and properly align similarly oriented first 260 and second 262 passages based on the axes 212 and 214.

Turning now to FIG. 5B, it shows an embodiment 520 of the second passage 262 of the second flange 250. As shown, the inlet 258 of the second passage 262 is wider in the embodiment 520 of FIG. 5B compared to the inlet 258 shown in FIG. 2. This widening may be referred to as a receiving platform 522, wherein the receiving platform 522 allows a fastener (e.g., one fastener of the fasteners 230 of FIG. 2) to pass through the second passage 262. However, the receiving platform 522 may be sized such that a head of the fastener sits along the receiving platform 522 and does not extend further into the second passage 262. In some example additionally or alternatively, the receiving platform 522 may be sized such that an extreme end of the head of the fastener is flush with the chamfered surface 284 of the second flange 250. In this way, the chamfered surface 284 appears smooth when the fastener extends fully through the second passage 250.

Additionally or alternatively, dashed lines 532 and 534 depict optional embodiments of the chamfered surface 284 and the second surface (e.g., second surface 282 of FIG. 2), respectively. As shown, the dashed line 532 extends from the second flange 250 beyond a location of the inlet 258 where a head of the fastener 230 may reside. The dashed line 534 depresses into a body of the second flange 250 such that its curvature is counter to and/or opposite to the curvature of dashed line 532. In one example, the second flange 250 comprises both the modifications of dashed lines 532 and 534. Additionally or alternatively, the second flange 250 comprises either the modification of dashed line 532 or dashed line 534. It will be appreciated that a shape of one or more outer surfaces of the second flange 250 or the first flange 248 may be modified while maintaining an angle of the first and second passages without departing from the scope of the present disclosure.

Turning now to FIG. 5C, it shows an embodiment 540 of the first flange 248. In the embodiment 540, the first flange 248 is shown curving in a downward direction such that a central axis 542 of the first flange 248 is misaligned with the central axis 298. This may be to accommodate various exhaust system-packaging geometries. The central axis 542 may pass through a center of the second flange (e.g., second flange 250 of FIG. 2) such that a direction of exhaust gas flow is parallel to the central axis 542. In other words, exhaust gas flowing out of the turbine housing 206 turns from a direction parallel to the central axis 298 to a direction parallel to the central axis 542, where the exhaust gas flow parallel to the central axis 542 until it reaches a catalyst housing (e.g., catalyst housing 240).

In this way, a one or more flanges of a turbine housing and a catalyst housing may be chamfered to reduce a distance between the turbine housing and the catalyst housing. A drill and/or some other tool may still access and lock a fastener arranged in passages of the flanges. The technical effect of chamfering the flanges of the turbine housing and the catalyst housing is to decrease a distance between a catalyst and the turbine housing. By doing this, the catalyst temperature may rise more quickly during a cold-start due to deceased thermal losses, which may decrease emissions.

An embodiment of a system comprises a turbine housing comprising a first passage arranged within a first flange configured to centrally align with a second passage arranged within a chamfer of a second flange of a catalyst housing and a fastener passing through the second passage and locked with the first passage. A first example of the system further includes where the first flange is chamfered. A second example of the system, optionally including the first example, further includes where the first passage and second passage are angled relative to a central axis of the catalyst housing. A third example of the system, optionally including the first and/or second examples, further includes where the turbine housing directs exhaust gas between a space arranged between the first and second flanges to the catalyst housing, and where the exhaust gas flows in a direction parallel to the central axis. A fourth example of the system, optionally including one or more of the first through third examples, further includes where the first passage and second passage centrally align about their geometric centers, and where an axis extending from the geometric centers of the first and second passages is perpendicular to the chamfer of the second flange. A fifth example of the system, optionally including one or more of the first through fourth examples, further includes where the chamfer comprises a plane extending obliquely to a central axis of the catalyst housing, and where an angle measured between the plane and the central axis is between 10 to 60 degrees. A sixth example of the system, optionally including one or more of the first through fifth examples, further includes where the first passage comprises a first diameter and the second passage comprises a second diameter, and where the second diameter is greater than the first diameter. A seventh example of the system, optionally including one or more of the first through sixth examples, further includes where the fastener comprises a third diameter equal to the first diameter, and where the fastener is spaced away from and does not touch interior surfaces of the second passage when the fastener is locked with the first passage. An eighth example of the system, optionally including one or more of the first through seventh examples, further includes where the first passage and the second passage are hermetically sealed when the first flange and second flange are pressed together and the fastener is locked with the first flange. A ninth example of the system, optionally including one or more of the first through eighth examples, further includes where the fastener extends through an entire width of the second flange and at least a portion of the width of the first flange. A tenth example of the system, optionally including one or more of the first through ninth examples, further includes where there are no other inlets or additional outlets other than a turbine housing outlet and a catalyst housing inlet.

An embodiment of a method, comprising spinning a turbine wheel within a turbine housing, the turbine housing including a planar, first surface engaged in face-sharing contact with a counterpart planar, second surface of a flange of a catalyst housing by a fastener inserted through both the first surface and second surface along an insertion axis that is not orthogonal to the first surface or second surface and flowing exhaust gas from the turbine housing through a first opening of the first surface, through a second opening of the second surface, and into the catalyst housing.

An embodiment of an engine exhaust system, comprises a turbocharger including a turbine housing forming a first exhaust flow passage, a catalytic converter including a catalyst housing forming a second exhaust flow passage, a first flange formed by the turbine housing and surrounding the first exhaust flow passage, the first flange including a first planar surface extending radially from the first exhaust flow passage, a second flange formed by the catalyst housing and surrounding the second exhaust flow passage, the second flange including a second planar surface extending radially from the second exhaust flow passage and an angled surface joined to the second planar surface, the angled surface angled away from the second planar surface, the second planar surface arranged to be parallel to the first planar surface and where a line normal to the first and second planar surfaces is arranged to be parallel to a rotational axis of the turbocharger, and a fastener passage forming an opening at the angled surface, the fastener passage extending through the first and second planar surfaces and into the turbine housing in an orthogonal direction relative to the angled surface. A first example of the engine system further includes where the angled surface is positioned radially around the rotational axis of the turbocharger and surrounds the rotational axis. A second example of the engine system, optionally including the first example, further includes the fastener passage is one of a plurality of fastener passages, with each fastener passage of the plurality of fastener passages forming a separate, different opening at the angled surface, and with each fastener passage extending through the first and second planar surfaces along an axis different from an axis of each other fastener passage and orthogonal relative to the angled surface. A third example of the engine system, optionally including the first and/or second examples, further includes the axis of each fastener passage intersects with the axis of each other fastener passage at an intersection along the rotational axis of the turbocharger, the intersection being between a compressor of the turbocharger and the turbine housing.

In another representation, a system comprises a catalyst housing, a turbine housing including a planar surface shaped to engage a counterpart planar surface of the catalyst housing, and a passage extending from an angled surface of the catalyst housing through each of the planar surface and counterpart planar surface along an axis arranged orthogonal to the angled surface and not orthogonal to the planar surface and counterpart planar surface, the passage shaped to receive a fastener. The system may further include wherein the counterpart planar surface and the angled surface are each formed by a catalyst housing flange, and wherein an opening of the catalyst housing flange forms an inner perimeter of a catalyst housing exhaust flow conduit. The system may further includes where the planar surface is formed by a turbine housing flange, and wherein an opening of the turbine housing flange forms an inner perimeter of a turbine housing exhaust flow conduit. The system may further includes where the passage includes a first section formed by a catalyst housing flange and a second section formed by the turbine housing. The system may further includes where the first section is a through-hole extending entirely through the catalyst housing flange from the angled surface to the counterpart planar surface, the through-hole forming a first aperture positioned at the angled surface and a second aperture positioned at the counterpart planar surface. The system may further includes where the second section is a blind hole extending partially through the turbine housing from the planar surface and forming a third aperture at the planar surface, the third aperture positioned to align with the second aperture of the through-hole. The system may further includes where the turbine housing houses a turbine wheel, the turbine wheel being rotatable within the turbine housing around a central axis of the turbine housing, and wherein the central axis of the turbine housing extends in an orthogonal direction relative to the planar surface and the counterpart planar surface. The system may further includes where a first axis positioned parallel to the angled surface intersects the central axis of the turbine housing at a location within the catalyst housing. The system may further includes where a fastener insertion axis of the passage intersects the central axis of the turbine housing along a shaft positioned between the turbine wheel and a compressor wheel, the turbine wheel rotatably coupled to the compressor wheel by the shaft. The system may further includes where the fastener insertion axis is orthogonal to the angled surface and the first axis. The system may further includes where a first angle of the fastener insertion axis relative to the central axis of the turbine housing is less than 90 degrees, a second angle of the first axis relative to the central axis of the turbine housing is less than 90 degrees, and the second angle is greater than the first angle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A turbocharger system comprising:
a turbine housing comprising a first passage including an end within the first passage, the first passage arranged within a first flange configured to centrally align with a second passage arranged within an angled surface of a second flange of a catalyst housing, the second passage extending through the second flange, and a fastener passing through each of the first and second passages.

2. The system of claim 1, wherein the first passage does not extend through the first flange, and wherein the angled surface is a chamfer, and where the chamfer is perpendicular to a central axis of the second passage, and where the first flange is chamfered.

3. The system of claim 1, wherein each of an axis extending from a geometric center of the first passage and an axis extending from a geometric center of the second passage form an angle to a central axis of the catalyst housing and the turbine housing relatively.

4. The system of claim 3, wherein the turbine housing directs exhaust gas from an engine to a space arranged between the first and second flanges to the catalyst housing, and where the exhaust gas flows in a direction parallel to the central axis.

5. The system of claim 1, wherein the first passage includes an axis centrally aligned with a geometric center of the first passage and extending from the geometric center of the first passage, and wherein the second passage includes an axis centrally aligned with a geometric center of the second passage and extending from the geometric center of the second passage, and wherein an axis extending from each of the geometric centers of the first and second passages is angled relative to the angled surface of the second flange.

6. The system of claim 1, wherein the chamfer comprises a plane extending obliquely to a central axis of the catalyst housing, and where an angle measured between the plane and the central axis is between 5 to 60 degrees.

7. The system of claim 1, wherein the first passage comprises a first diameter and the second passage comprises a second diameter, and where the second diameter is greater than the first diameter.

8. The system of claim 1, wherein the first passage and the second passage are hermetically sealed when the first flange and the second flange are pressed together and the fastener is locked with the first flange.

9. The system of claim 1, wherein the fastener extends through an entire width of the second flange and at least a portion of a width of the first flange.

10. The system of claim 1, wherein there are no other inlets or additional outlets other than a turbine housing outlet and a catalyst housing inlet.

11. A method for coupling a turbocharger in an engine exhaust system, comprising:
coupling a turbine housing to a catalyst housing spinning a turbine wheel within a turbine housing, the turbine housing including a planar, first surface engaged in face-sharing contact with a counterpart planar, second surface of a flange of a catalyst housing by a fastener inserted through both the first surface and the second surface along an insertion axis that is not orthogonal to the first surface or the second surface, and wherein the fastener is inserted into a passage including an end, the passage located within a flange of the turbine housing; and flowing exhaust gas provided via an engine from the turbine housing through a first opening of the first surface, through a second opening of the second surface, and into the catalyst housing.

12. The method of claim 11, further comprising arranging the first surface and the second surface in parallel with one another, and arranging a rotational axis of a turbine wheel normal to each of the first surface and the second surface.

13. The method of claim 12, further comprising spinning a shaft coupling the turbine wheel to a compressor wheel, the shaft being positioned along the rotational axis of the turbine wheel and intersecting the insertion axis.

14. The method of claim 11, wherein flowing exhaust gas from the turbine housing and into the catalyst housing includes flowing exhaust gas through an intersection of the rotational axis of the turbine wheel with an angled axis.

15. The method of claim 14, further comprising flowing exhaust gas from the intersection to a catalyst of the catalyst housing, the intersection being positioned upstream of the catalyst relative to a direction of exhaust gas flowing from the turbine housing into the catalyst housing.

16. An engine exhaust system, comprising:
a turbocharger including a turbine housing forming a first exhaust flow passage;
a catalytic converter including a catalyst housing forming a second exhaust flow passage;
a first flange formed by the turbine housing and surrounding the first exhaust flow passage, the first flange including a first planar surface extending radially from the first exhaust flow passage;
a second flange formed by the catalyst housing and surrounding the second exhaust flow passage, the second flange including a second planar surface extending radially from the second exhaust flow passage and an angled surface joined to the second planar surface, the angled surface angled away from the second planar surface, the second planar surface arranged to be parallel to the first planar surface and where a line normal to the first and second planar surfaces is arranged to be parallel to a rotational axis of the turbocharger; and
a fastener passage forming an opening at the angled surface, the fastener passage extending through the first and second planar surfaces and into the turbine housing in an orthogonal direction relative to the angled surface.

17. The engine exhaust system of claim 16, wherein the angled surface is positioned radially around the rotational axis of the turbocharger and surrounds the rotational axis.

18. The engine exhaust system of claim 17, wherein the fastener passage is one of a plurality of fastener passages, with each fastener passage of the plurality of fastener passages forming a separate, different opening at the angled surface, and with each fastener passage of the plurality of fastener passages extending through the first and second planar surfaces along an axis different from an axis of each other fastener passage of the plurality of fastener passages and orthogonal relative to the angled surface.

19. The engine exhaust system of claim 18, wherein the axis of each fastener passage of the plurality of fastener passages intersects with the axis of each other fastener passage of the plurality of fastener passages at an intersection along the rotational axis of the turbocharger;
wherein the intersection is positioned in a shaft housing being between a compressor housing and the turbine housing of the turbocharger.

* * * * *